US012680939B2

(12) United States Patent
Kishore et al.

(10) Patent No.: US 12,680,939 B2
(45) Date of Patent: Jul. 14, 2026

(54) INTEGRATED FLOW SAMPLING APPARATUS FOR A FLOW CYTOMETRY SYSTEM

(71) Applicant: Honeywell International Inc., Charlotte, NC (US)

(72) Inventors: Kuna Venkat Satya Rama Kishore, Charlotte, NC (US); Kaligaselvi Lenin, Charlotte, NC (US); Debendra Utkarsh, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 249 days.

(21) Appl. No.: 18/467,376

(22) Filed: Sep. 14, 2023

(65) Prior Publication Data

US 2024/0110858 A1 Apr. 4, 2024

(30) Foreign Application Priority Data

Sep. 30, 2022 (IN) .............................. 202211056405

(51) Int. Cl.
G01N 15/1404 (2024.01)
G01N 15/01 (2024.01)
G01N 15/10 (2024.01)

(52) U.S. Cl.
CPC ......... *G01N 15/1404* (2013.01); *G01N 15/01* (2024.01); *G01N 2015/1006* (2013.01)

(58) Field of Classification Search
CPC ............... G01N 15/1404; G01N 15/01; G01N 2015/1006

(Continued)

(56) References Cited

U.S. PATENT DOCUMENTS 10,605,718 B2 3/2020 Henkel et al.
2007/0031289 A1 2/2007 Cox et al.
(Continued)

FOREIGN PATENT DOCUMENTS

EP 1901847 B1 4/2015
EP 2762854 B1 3/2021
WO 2019/118929 A1 6/2019

OTHER PUBLICATIONS

Partial European Search Report Mailed on Feb. 12, 2024 for EP Application No. 23196472, 12 page(s).

(Continued)

*Primary Examiner* — Peter J Macchiarolo
*Assistant Examiner* — Rodney T Frank
(74) *Attorney, Agent, or Firm* — Alston & Bird LLP

(57) ABSTRACT

An apparatus and system for integrating flow cytometry measurements into a medical procedure. An example integrated flow sampling apparatus may include a discharge tube, fluidly connecting a catheter within a patient to a drainage bag. In addition, the apparatus may include an integrated flow sampling cassette. The integrated flow sampling cassette may include a bypass tube having two ends, each fluidly connected to the discharge tube. The bypass tube may further include a flow detection region enabling detection of a flow of discharge fluid through the bypass tube; an imaging region enabling detection of cells within the flow of discharge fluid; and a flow control valve enabling impedance of the flow of discharge fluid through the bypass tube. The apparatus may additionally include protrusions extending into the discharge tube and facilitating the entry of the discharge fluid into the bypass tube and subsequently back into the discharge tube.

20 Claims, 6 Drawing Sheets

(58) Field of Classification Search
USPC .......................................................... 73/863
See application file for complete search history.

(56) References Cited

U.S. PATENT DOCUMENTS

| 2007/0144277 | A1 | 6/2007 | Padmanabhan et al. |
| 2014/0211205 | A1 | 7/2014 | Bardell et al. |

OTHER PUBLICATIONS

Extended European Search Report Mailed on May 6, 2024 for EP Application No. 23196472, 11 page(s).

INTEGRATED FLOW SAMPLING APPARATUS FOR A FLOW CYTOMETRY SYSTEM

CROSS-REFERENCE TO RELATED APPLICATIONS

This application claims priority pursuant to 35 U.S.C. 119(a) to Indian Application No. 202211056405, filed Sep. 30, 2022, which application is incorporated herein by reference in its entirety.

TECHNOLOGICAL FIELD

Embodiments of the present disclosure relate generally to a sampling apparatus for a flow cytometry system, and more particularly, to a sampling apparatus integrated into a tube carrying bodily fluid to or from a patient.

BACKGROUND

Applicant has identified many technical challenges and difficulties associated with performing measurements on bodily fluids, such as blood, using a flow cytometry system. Through applied effort, ingenuity, and innovation, Applicant has solved problems related to the method of performing flow cytometry on a sample of bodily fluid by developing solutions embodied in the present disclosure, which are described in detail below.

BRIEF SUMMARY

Various embodiments are directed to an example apparatus and system for obtaining cytometry measurements of a bodily fluid by utilizing an integrated flow sampling cassette.

In accordance with some embodiments of the present disclosure, an example integrated flow sampling apparatus is provided. In some embodiments, the integrated flow sampling apparatus may comprise a discharge tube, fluidly connecting a catheter to a drainage bag, wherein a discharge fluid flows from the catheter to the drainage bag. The integrated flow sampling apparatus may further include an integrated flow sampling cassette, comprising a bypass tube having a first end and a second end, wherein the first end and the second end are each fluidly connected to the discharge tube. The bypass tube of the integrated flow sampling cassette may further comprise a flow detection region enabling detection of a flow of discharge fluid through the bypass tube; an imaging region enabling detection of structures within the flow of discharge fluid; and a flow control valve enabling impedance of the flow of discharge fluid through the bypass tube. The integrated flow sampling apparatus may further comprise a first protrusion extending from the first end of the bypass tube into the discharge tube at a first pre-determined angle such that the first protrusion directs a portion of the discharge fluid into the bypass tube; and a second protrusion extending from the second end of the bypass tube into the discharge tube at a second pre-determined angle such that the second protrusion facilitates a re-entry of the discharge fluid into the bypass tube.

In some embodiments, the flow detection region may comprise a thin membrane, wherein the thin membrane deforms in response to a change in pressure.

In some embodiments, the flow detection region may comprise a transparent membrane, enabling detection of flow through optical means.

In some embodiments, the imaging region may control the flow of discharge fluid such that an external device may detect cells within the discharge fluid.

In some embodiments, the imaging region may be less than one square centimeter.

In some embodiments, the imaging region may be between 5.5 millimeters and 6.5 millimeters long, between 5.5 millimeters and 6.5 millimeters tall, and between 0.35 millimeters and 0.45 millimeters deep.

In some embodiments, the flow control valve may be a ball valve.

In some embodiments, the flow control valve may be controlled by an external device.

In some embodiments, the external device may be a flow cytometry device.

In some embodiments, the integrated flow sampling cassette may be defined to fit within a measurement slot on the external device.

In some embodiments, the integrated flow sampling cassette may comprise molded components.

In some embodiments, the integrated flow sampling cassette may comprise a plurality of molded components attached to form the bypass tube.

In some embodiments, the integrated flow sampling apparatus may further comprise a second flow detection region, wherein the flow detection region is positioned upstream from the imaging region and the second flow detection region is positioned downstream from the imaging region.

In some embodiments, the external device may measure a first pressure at the flow detection region and a second pressure at the second flow detection region and determine a flow rate based on the first pressure, the second pressure, and one or more dimensions of the bypass tube.

In some embodiments, the first pre-determined angle may be between 20 and 30 degrees.

In some embodiments, the second pre-determined angle may be between 20 and 30 degrees.

An example integrated flow cytometry measurement system is further provided. In some embodiments, the example integrated flow cytometry measurement system, may comprise a catheter inserted into a body of a patient. The example integrated flow cytometry measurement system may further comprise a discharge tube, fluidly connecting the catheter to a drainage bag, wherein a discharge fluid flows from the catheter to the drainage bag. In addition, the example integrated flow cytometry measurement system may further comprise an integrated flow sampling cassette, comprising a bypass tube including a first end and a second end, wherein the first end and the second end are each fluidly connected to the discharge tube. The bypass tube may further comprise a flow detection region enabling detection of a flow of discharge fluid through the bypass tube; an imaging region enabling detection of cells within the flow of discharge fluid; and a flow control valve enabling impedance of the flow of discharge fluid through the bypass tube. The example integrated flow cytometry measurement system may further comprise a first protrusion extending from the first end of the bypass tube into the discharge tube at a first pre-determined angle such that the first protrusion directs a portion of the discharge fluid into the bypass tube, and a second protrusion extending from the second end of the bypass tube into the discharge tube at a second pre-determined angle such that the second protrusion facilitates the re-entry of the discharge fluid into the bypass tube. In addition, the example integrated flow cytometry measurement system may comprise a flow cytometry device, wherein integrated flow sampling cassette is inserted into a measurement slot on the flow cytometry device, and wherein the flow cytometry device determines a count of at least one cell type within the flow of discharge fluid.

An example integrated flow cassette for obtaining cytometry measurements is further provided. In some embodiments, example integrated flow cassette may comprising a first molded component, and a second molded component, wherein at least one surface of the first molded component and/or second molded component are etched to form a bypass tube. In some embodiments, the bypass tube may comprise a first end; a second end; and an imaging region. In some embodiments, the first end and the second end may each be fluidly connected to a primary flow tube, the primary flow tube facilitating a flow of a fluid comprising at least a portion of bodily fluid from a catheter to a discharge bag. In some embodiments, the imaging region may enable detection of structures within the flow of the fluid by an external device. In some embodiments, the first molded component and the second molded component of the example integrated flow cassette may be attached, such that the bypass tube is formed in the space between the first molded component and the second molded component.

In some embodiments, the external device may be a flow cytometry device and the integrated flow cassette may be designed to fit into a measurement slot on the flow cytometry device.

In some embodiments, the bypass tube may further comprise a flow detection region enabling detection of the flow of the fluid comprising at least a portion of bodily fluid through the bypass tube; and a flow control valve enabling an impedance of the flow of the fluid comprising at least a portion of bodily fluid through the bypass tube.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
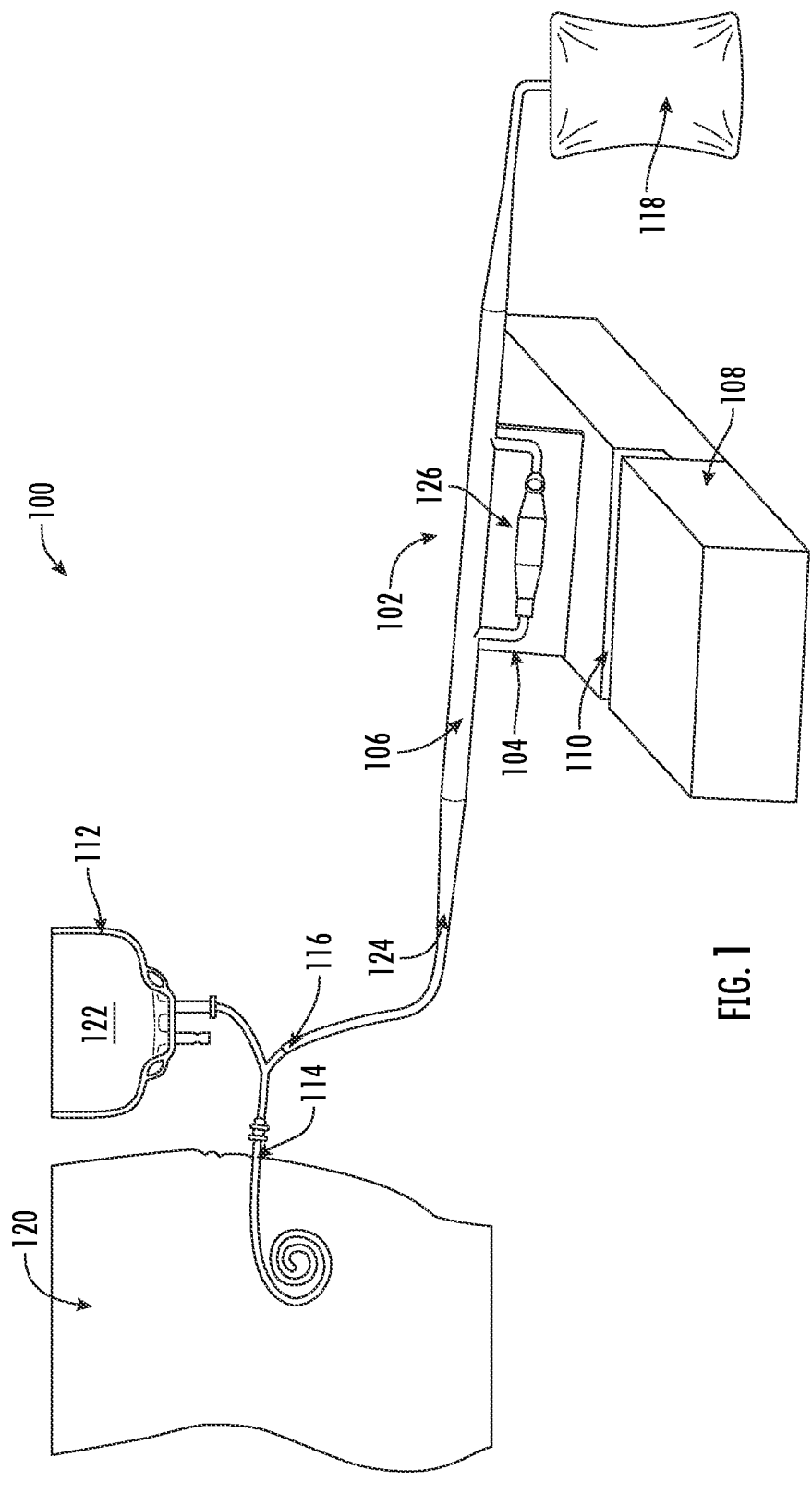
FIG. 1 illustrates an overall view of an example flow cytometry measurement system in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements Like numbers refer to like elements throughout.

Various example embodiments address technical problems associated with performing cytometry measurements on the bodily fluids of a patient or other fluids discharged during a medical procedure. As understood by those of skill in the field to which the present disclosure pertains, there are numerous example scenarios in which a medical professional may need to perform cytometry measurements on the bodily fluids of a patient.

For example, medical professionals performing medical treatments, such as dialysis, may perform cytometry measurements on the discharged fluids, particularly when a peritoneal dialysis is performed. For patients receiving a peritoneal dialysis, a medical professional will insert a soft, thin tube, or catheter having an inlet connector and a discharge connector, into the stomach of the patient. This catheter enters the membrane lining the cavity of the abdomen called the peritoneum. The blood of the patient can be filtered by tiny blood vessels inside the peritoneum if aided by a dialysis solution. Thus, when a peritoneal dialysis is performed, a patient or medical professional connects a bag of dialysis solution to the inlet connector of the catheter. The patient or medical professional then allows the dialysis solution to flow into the catheter and into the peritoneal cavity. After a period of time, the patient or medical professional connects a tube to the discharge connector of the catheter and allows the discharge fluid to drain. The discharge fluid contains the dialysis solution as well as waste products and toxins filtered from the patient's blood.

Performing cytometry measurements on the discharge fluid may provide insights into the overall health of the patient. For example, cytometry measurements can be used to count types of white blood cells. The white blood cell count of a patient may be indicative of the health of a patient's immune system. Cytometry measurements may also be used to perform complete blood counts which may indicate diseases, disorders, or infections in a patient. In addition, cytometry measurements can be used to identify cancer cells or identify other anomalies in a patient's cells.

Cytometry measurements can be an important tool for medical professionals when determining the overall health of a patient.

Commonly, obtaining cytometry measurements for a patient may be difficult, expensive, and time consuming. A medical professional may obtain sample fluid from a patient for performing cytometry measurements by drawing blood using a needle or catheter, or by collecting blood, or other discharged fluid from a tube providing a patient's intravenous (IV) fluid, tubing used to perform a dialysis, or from other devices used as part of a patient's medical treatment. A medical professional may store the blood or other discharge fluid in a vial and ship the sample to a lab to perform cytometry measurements. Not only is this process time consuming, but the drawing, storing, and shipping of the patient's bodily fluid may expose the patient to additional discomfort, and/or may result in contamination of the patient's sample.

The various example embodiments described herein utilize various techniques and devices to perform cytometry measurements on a blood sample or other discharged fluid of a patient. For example, in some embodiments, a flow sampling apparatus, including a flow sampling cassette, may be integrated into the tubing (e.g., primary flow tube) used to perform a medical procedure on a patient (e.g., a dialysis procedure). The flow sampling apparatus may be integrated with the discharge tube of a dialysis medical procedure, for example.

When integrated with the tubing of a medical procedure, the flow sampling apparatus may redirect some of the blood or discharge fluid into a bypass tube. In some embodiments, the flow sampling apparatus may include a protrusion or other membrane extending into the tubing, directing a portion of the blood or discharge fluid into the bypass tube. In some embodiments, two portions of thin molded plastic may be attached to form the bypass tube and other features of the integrated flow sampling apparatus, forming a flow sampling cassette. The bypass tube may direct the blood or discharge fluid into an imaging area that positions the blood or discharge fluid such that the flow cytometry device may determine characteristics of the cells and other structures in the fluid.

In addition, the bypass tube may include one or more flow detection regions. The flow detection regions may allow an external device, such as a flow cytometry device, to determine if the fluid is flowing through the bypass tube, and in some embodiments, the rate of flow of the fluid in the bypass tube. Further, the bypass tube may include a flow control valve that enables impedance and release of the flow of fluid through the bypass tube. The flow sampling apparatus further includes an outlet protrusion or other membrane extending into the tubing used to perform the medical procedure, facilitating the reentry of the fluid into the tubing.

In some embodiments, the features of the bypass tube may allow insertion of the flow sampling cassette portion of the flow sampling apparatus directly into an external device, such as a flow cytometry device. The external device may monitor the flow of fluid through the bypass tube by monitoring fluid flow through one or more flow detection regions. In addition, the external device may control the flow of fluid through the bypass tube by manipulating the flow control valve on the bypass tube. Utilizing these controls, the external device may perform flow cytometry measurements on the fluid in the imaging region of the bypass tube. These flow cytometry measurements may be performed without drawing a sample of fluids from the patient or from the tubing used to perform the medical procedure on the patient.

As a result of the herein described example embodiments and in some examples, the process of obtaining flow cytometry measurements from a sample of blood or other discharge fluids may be greatly simplified. The need to draw and package samples to be sent to a lab for testing may be eliminated. Such an apparatus may enable medical professionals to make real time determinations on the overall health of a patient, increasing the effectiveness of care. In addition, utilizing molded biocompatible materials allow the integrated flow sampling device to be manufactured in a cost-effective manner. In addition, the integrated flow sampling apparatus, including the integrated flow sampling cassette and discharge tubing may be designed to be disposed after use.

Referring now to FIG. 1, an example flow cytometry measurement system 100 is depicted. As depicted in FIG. 1, the example flow cytometry measurement system 100 includes a treatment solution bag 112 containing a treatment solution 122. In the example flow cytometry measurement system 100 the treatment solution 122 flows into the abdomen of a patient 120 via a catheter 114. Once the treatment solution 122 has filtered toxins and waste products from the blood of the patient 120, the treatment solution 122 contains toxins and waste products and is ready to be discharged from the body of the patient 120 as discharge fluid 124 through the discharge tube 106. The discharge tube 106 is connected to the discharge tube connector 116, allowing the treatment solution 122 containing toxins and waste products (e.g., discharge fluid 124) to flow through the discharge tube 106, toward an integrated flow sampling apparatus 102 and a discharge bag 118.

As discharge fluid 124 flows through the integrated flow sampling apparatus 102, a portion of the discharge fluid 124 may be directed into the bypass tube 126 of the integrated flow sampling cassette 104 portion of the integrated flow sampling apparatus 102. The integrated flow sampling cassette 104, containing a portion of the discharge fluid 124, may be inserted into a sampling cassette slot 110 of a flow cytometry device 108. The flow cytometry device 108 may determine cytometry measurements on the portion of the discharge fluid 124 contained in the integrated flow sampling cassette 104.

As further depicted in FIG. 1, the portion of the discharge fluid 124 directed into the bypass tube 126 of the integrated flow sampling cassette 104 is directed back into the discharge tube 106 of the flow cytometry measurement system 100. The discharge fluid 124 contained in the discharge tube 106 continues to flow through the discharge tube 106 to where it is collected in the discharge bag 118.

Figure 2A:
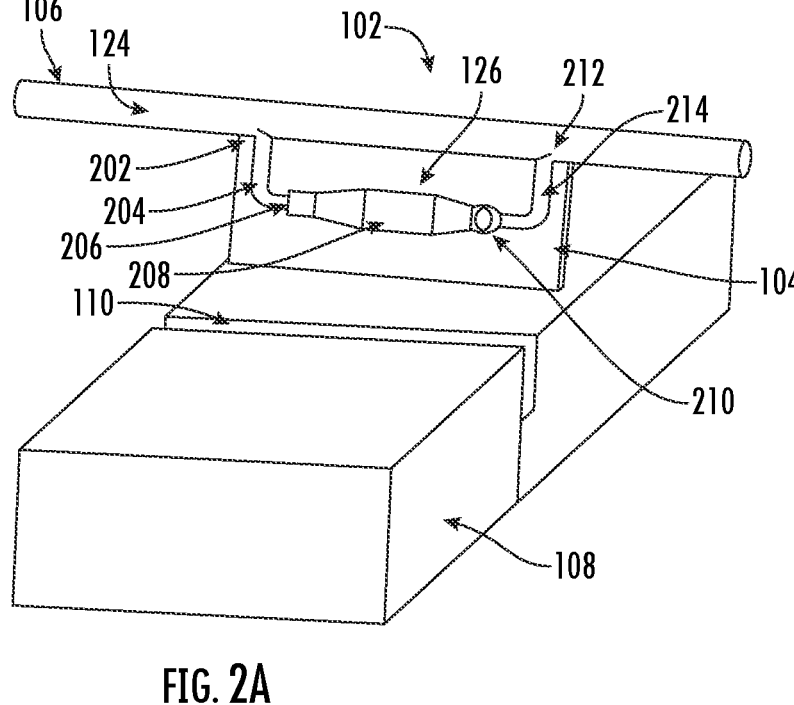
FIG. 2A illustrates an example flow sampling apparatus comprising a flow sampling cassette integrated into a medical treatment mechanism in accordance with an example embodiment of the present disclosure.

Referring now to FIG. 2A, a detailed view of an example integrated flow sampling apparatus 102 is depicted. As depicted in FIG. 2A, the example integrated flow sampling apparatus 102 includes a discharge tube 106 and an integrated flow sampling cassette 104, the integrated flow sampling cassette 104 designed to fit in the sampling cassette slot 110 of a flow cytometry device 108. As depicted in FIG. 2A, the example integrated flow sampling apparatus 102 further includes an inlet flow membrane 202 directing a portion of the discharge fluid 124 into the bypass tube 126 of the integrated flow sampling cassette 104. The bypass tube 126 provides a fluid path for the discharge fluid 124 through the integrated flow sampling cassette 104 and back into the discharge tube 106. The example bypass tube 126 further contains a bypass flow inlet tube 204, a flow detection region 206, an imaging region 208, and a flow control valve 210.

As illustrated in FIG. 2A, the example integrated flow sampling apparatus 102 includes an integrated flow sampling cassette 104. An integrated flow sampling cassette 104 may be any device, structure, cassette, cartridge, casing, housing, glass slide, or other similar formation capable of insertion into a measurement slot (e.g., sampling cassette slot 110) of a flow cytometry device 108. The integrated flow sampling apparatus 102 may comprise a biocompatible material such as polyvinyl chloride (PVC), polyethylene, thermoplastic elastomers, polypropylene plastic, or other material suitable for use in medical applications. An integrated flow sampling cassette 104 may further interface with tubing or another similar conduit containing bodily fluid or any other fluid (e.g., discharge fluid 124) upon which cytometry measurements may be made. In some embodiments, an integrated flow sampling cassette 104 may be attached to existing tubing (e.g., discharge tube 106) such that a fluid connection is made between the tubing and the fluid path of the integrated flow sampling cassette 104 (e.g., bypass tube 126).

Figure 4A:
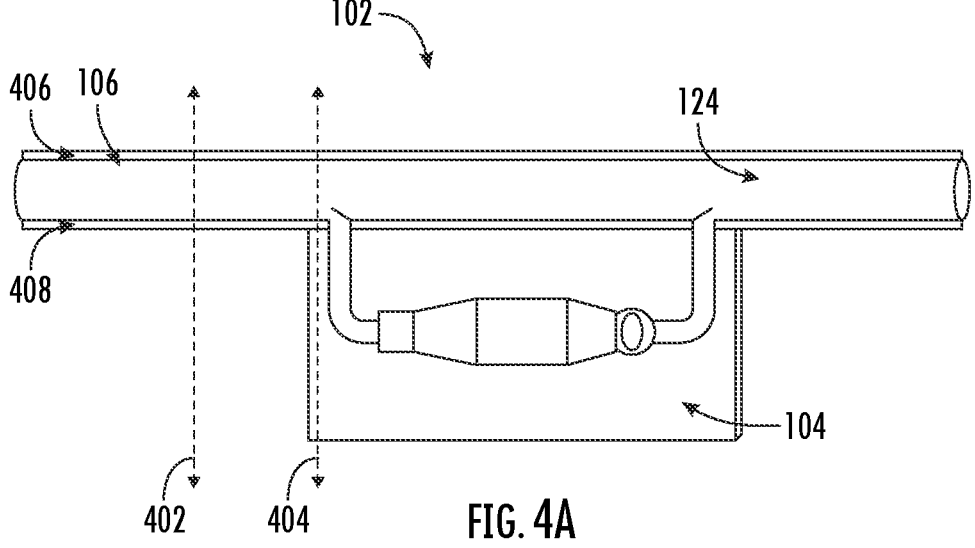
FIG. 4A illustrates another example flow sampling apparatus in accordance with an example embodiment of the present disclosure.
Figure 4B:
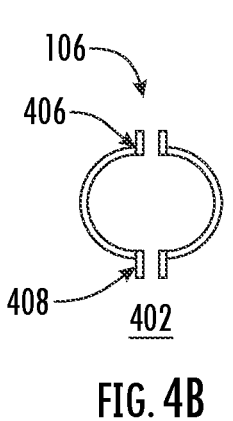
FIG. 4B-FIG. 4C illustrate various cross-section views of the disconnected sides of an example flow sampling apparatus previous to attachment of the two sides.
Figure 4C:
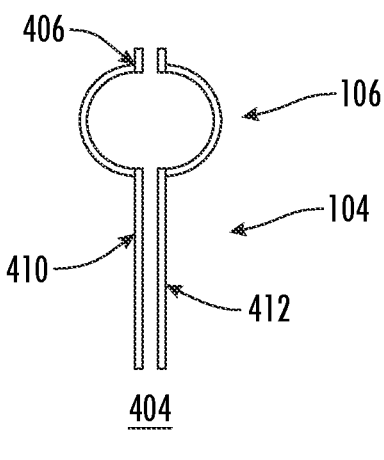

In some embodiments, the integrated flow sampling cassette 104 may comprise two portions (e.g., molded component 410 and molded component 412 as further described in relation to FIG. 4A-FIG. 4C) of a molded plastic or thermoplastic. One or both portions may have features etched or carved on the surface of the component. The portions may be attached with the surface containing the etched structures coupled to each other to form the various structures of the integrated flow sampling apparatus 102. In some embodiments, a portion of the tubing (e.g., discharge tube 106) may be manufactured in conjunction with the integrated flow sampling cassette 104. The various structures of the integrated flow sampling cassette 104 may provide a fluid path through which bodily fluid or any other fluid (e.g., discharge fluid 124) flowing through the discharge tube 106 may flow through the integrated flow sampling cassette 104.

In some embodiments, the integrated flow sampling cassette 104 may comprise transparent materials such as PVC, polycarbonate, or glass; opaque materials; or any combination of transparent and opaque materials. In some embodiments, the integrated flow sampling cassette 104 may be dimensioned to conform with the size requirements of a measurement slot in an external device, such as sampling cassette slot 110. In some embodiments, the integrated flow sampling cassette 104 may comprise a length between 40 millimeters and 110 millimeters; more preferably between 45 millimeters and 105 millimeters; most preferably between 50 millimeters and 100 millimeters. In some embodiments, the integrated flow sampling cassette 104 may comprise a width between 10 millimeters and 70 millimeters; more preferably between 15 millimeters and 65 millimeters; most preferably between 20 millimeters and 60 millimeters. In some embodiments, the integrated flow sampling cassette 104 may comprise a thickness between 1.5 millimeters and 6 millimeters; more preferably between 1.75 millimeters and 5.5 millimeters; most preferably between 2 millimeters and 5 millimeters.

As further illustrated in FIG. 2A, the example integrated flow sampling apparatus 102 further includes a discharge tube 106. A discharge tube 106 (e.g., primary flow tube) may be any tube, conduit, channel, or other similar structure capable of providing fluid communication between components of the flow cytometry measurement system 100. Particularly, the discharge tube 106 may be any conduit transmitting fluid between the catheter 114 in the patient 120, the catheter 114, the integrated flow sampling apparatus 102, the discharge bag 118, and/or other similar components of the medical treatment system. In some embodiments, the discharge tube 106 may comprise a biocompatible material such as polyvinyl chloride, polyethylene, thermoplastic elastomers, polypropylene plastic, or other similar material. The wall of the discharge tube 106 may provide a sealed conduit, such that the treatment solution 122, discharge fluid 124, or other fluid contained in the discharge tube 106 may not permeate the discharge tube 106 wall. In some embodiments, the discharge tube 106 may be transparent, such that the contents of the discharge tube 106, such as discharge fluid 124, may be visible.

In some embodiments, the discharge tube 106 may be manufactured as an integral component with the integrated flow sampling cassette 104. In one such embodiment, the discharge tube 106 may comprise two portions of a molded plastic or thermoplastic attached to form a conduit through which fluid may travel. In some embodiments, the discharge tube 106 may comprise a plurality of tubes comprised of different materials which interface to form a single fluid conduit. For example, the discharge tube 106 may comprise a portion fluidly connecting the discharge tube connector 116 with the integrated flow sampling apparatus 102, a separate portion to interface with the integrated flow sampling cassette 104, and yet another portion to fluidly connect the integrated flow sampling apparatus 102 with the discharge bag 118. In some embodiments, the discharge tube 106 may comprise a single continuous tube fluidly connecting the discharge tube connector 116 with the discharge bag 118 and interfacing with the integrated flow sampling cassette 104.

As further illustrated in FIG. 2A, the example integrated flow sampling cassette 104 includes a bypass tube 126 providing a fluid path through the integrated flow sampling cassette 104. The bypass tube 126 may be any tube, conduit, channel, or other similar structure providing a fluid path from the location where a portion of the fluid (e.g., discharge fluid 124) exits the discharge tube 106 into the bypass tube 126, to the location where the fluid re-enters the discharge tube 106. In some embodiments, the bypass tube 126 may maintain a thin profile such that the bypass tube 126 may be completely comprised within the thickness of the integrated flow sampling cassette 104, such that the integrated flow sampling cassette 104 may be inserted into a sampling cassette slot 110 of a flow cytometry device 108. In some embodiments, the bypass tube 126 may be etched or carved into the integrated flow sampling cassette 104. For example, as described above, in some embodiments the integrated flow sampling cassette 104 may comprise two attached portions or slides of molded thermoplastic. In such an embodiment, the bypass tube 126 may be etched and/or carved in one or both portions. When attached, the etched portions may form a fluid conduit (e.g., bypass tube 126) between the two portions such that fluid may flow through the conduit between the two portions.

As further illustrated in FIG. 2A, the example integrated flow sampling apparatus 102 includes an inlet flow membrane 202 and an outlet flow membrane 212 for diverting a portion of the flow of discharge fluid 124 into the integrated flow sampling cassette 104 and re-integrating the diverted portion of the discharge fluid 124 back into the discharge tube 106 after passing through the bypass tube 126. The inlet flow membrane 202 and the outlet flow membrane 212 may comprise any material capable of directing the flow of fluid (e.g., discharge fluid 124) into the bypass tube 126. In some embodiments, the inlet flow membrane 202 and the outlet flow membrane 212 may comprise a biocompatible material such as polyvinyl chloride, polyethylene, thermoplastic elastomers, polypropylene plastic, or other similar material. In some embodiments, the inlet flow membrane 202 and the outlet flow membrane 212 may be formed as an integral part of the manufacture of the integrated flow sampling apparatus 102. For example, the inlet flow membrane 202 and the outlet flow membrane 212 may be molded plastic or thermoplastic protrusions formed as part of the formation of the integrated flow sampling cassette 104, the discharge tube 106, or both.

In some embodiments, the inlet flow membrane 202 may be positioned near the opening in the discharge tube 106 where the discharge tube 106 fluidly connects to the bypass tube 126. In some embodiments, the inlet flow membrane 202 may comprise an attached end attached at or near the opening of the bypass tube 126 and a distal end protruding into the interior of the discharge tube 106 against the flow of the discharge fluid 124 at a predetermined angle such that the distal end may direct a portion of the flow of discharge fluid 124 into the opening of the bypass tube 126. In some embodiments, the inlet flow membrane 202 may protrude at an angle between 10 and 40 degrees, more preferably between 15 and 35 degrees, most preferably between 20 and 30 degrees. In some embodiments, the inlet flow membrane 202 may have a length between 0.4 millimeters and 0.6 millimeters; more preferably between 0.45 millimeters and 0.55 millimeters; most preferably between 0.48 millimeters and 0.52 millimeters. In some embodiments, the inlet flow membrane 202 may be shaped to conform to the cross-sectional shape of the opening of the bypass tube 126. For example, the inlet flow membrane 202 may comprise a semi-circular shape.

In some embodiments, the outlet flow membrane 212 may be positioned near the opening in the discharge tube 106 where the bypass tube 126 re-connects to the discharge tube 106, downstream from the inlet flow membrane 202. In some embodiments, the outlet flow membrane 212 may comprise an attached end attached at or near the opening of the terminal end of the bypass tube 126 and a distal end protruding into the interior of the discharge tube 106 at a predetermined angle with the flow of the discharge fluid 124 such that the distal end may partially block the discharge fluid 124 from entering in the terminal end of the bypass tube 126. In addition, the outlet flow membrane 212 may ease the merging of the portion of discharge fluid 124 that was directed into the bypass tube 126 back into the primary flow in the discharge tube 106. In some embodiments, the outlet flow membrane 212 may protrude at an angle between 10 and 40 degrees, more preferably between 15 and 35 degrees, most preferably between 20 and 30 degrees. In some embodiments, the outlet flow membrane 212 may have a length between 0.4 millimeters and 0.6 millimeters; more preferably between 0.45 millimeters and 0.55 millimeters; most preferably between 0.48 millimeters and 0.52 millimeters. In some embodiments, the outlet flow membrane 212 may be shaped to conform to the cross-sectional shape of the opening of the bypass tube 126. For example, the outlet flow membrane 212 may comprise a semi-circular shape.

In addition to providing a fluid conduit for the portion of the discharge fluid 124 directed into the integrated flow sampling cassette 104, the bypass tube 126 may additionally define a number of features, as depicted in FIG. 2A, that aid in the determination of cytometry measurements of the discharge fluid 124. As shown in FIG. 2A, the diverted portion of discharge fluid 124 first enters the bypass flow inlet tube 204, providing a fluid connection between the discharge tube 106 and the flow detection region 206.

As further illustrated in FIG. 2A, the example bypass tube 126 includes a flow detection region 206. The flow detection region 206 may be any device, structure, feature, or similar formation that enables an external device (e.g., flow cytometry device 108) to determine the flow and/or flow rate of the discharge fluid 124 within the bypass tube 126. In some embodiments, a pressure and or differential pressure may be utilized to determine the flow and/or flow rate of the discharge fluid 124 within the bypass tube 126 as further described in relation to FIG. 6B. In some embodiments, the flow detection region 206 may comprise a thin membrane of flexible material that may deform based on a change in pressure, such as PVC or polycarbonate. An external device may determine the pressure internal to the bypass tube 126 based on the deformations of the thin membrane in the flow detection region 206.

Figure 6A:
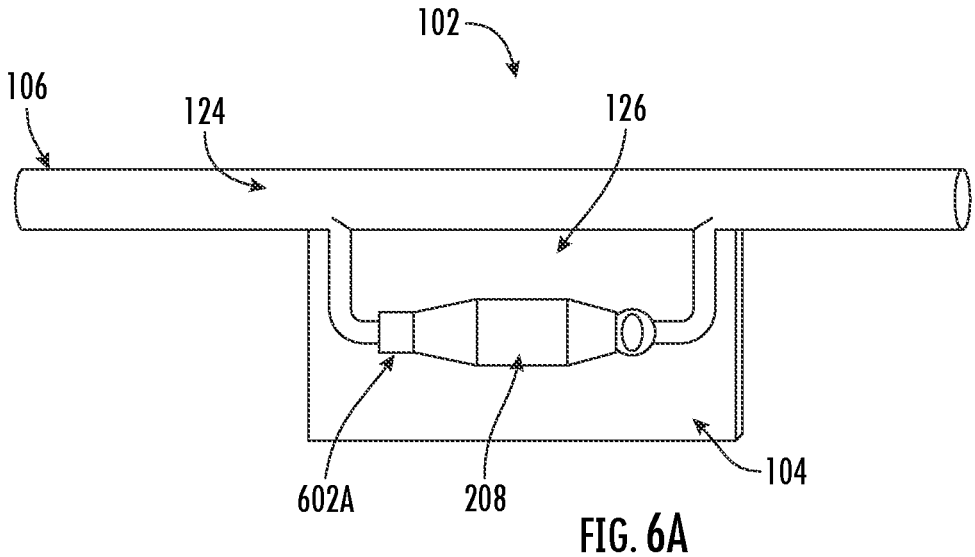
FIG. 6A illustrates an example flow sampling apparatus comprising an example flow detection window for detecting the flow of discharge fluid utilizing optical means in accordance with an example embodiment of the present disclosure.

In some embodiments, an external device (e.g., flow cytometry device 108) may utilize an optical laser or other optical sensor to determine flow within the bypass tube 126, as further described in relation to FIG. 6A. In some embodiments, a flow detection region 206 may comprise a transparent or semi-transparent window through which an external optical device may determine the presence of flow and/or the rate of flow within the bypass tube 126.

As further illustrated in FIG. 2A, the example bypass tube 126 includes an imaging region 208. An external device, such as flow cytometry device 108, may utilize a number of mechanisms to determine the cytometry measurements of a fluid, such as discharge fluid 124. For example, an external device may utilize one or more optical light sources (such as a laser beam) and one or more receivers to determine the size, complexity, phenotype, and other information related to the particles in a patient's 120 discharge fluid 124. In addition, in some embodiments, an external device may capture a hologram of body fluid cells to determine various features of body fluid cells.

In some embodiments, an external device may require specific characteristics as it relates to the flow of discharge fluid 124 through the imaging region 208. For example, in some embodiments, the particles may flow through the imaging region 208 in a single file line, one particle at a time. In such an embodiment, the bypass tube 126 may be defined such that particles within the discharge fluid 124 are forced into a single file line. In some embodiments, the external device may have a maximum area and/or depth through which the external device may perform measurements. For example, in an example embodiment, the imaging region 208 may be between 4 and 8 millimeters long; more preferably between 5 and 7 millimeters long; most preferably between 5.5 and 6.5 millimeters long. Additionally, in some embodiments, the imaging region 208 may be between 4 and 8 millimeters tall; more preferably between 5 and 7 millimeters tall; most preferably between 5.5 and 6.5 millimeters tall. Further, in some embodiments, the imaging region 208 may be between 0.2 and 0.6 millimeters deep; more preferably between 0.3 and 0.5 millimeters deep; most preferably between 0.35 and 0.45 millimeters deep.

In addition to the specific dimensions required by the external device, in some embodiments, the imaging region 208 may be transparent or semi-transparent such that optical operations may be performed, for example, the generation and capture of laser lights and/or the generation and capture of hologram images.

Figure 5A:
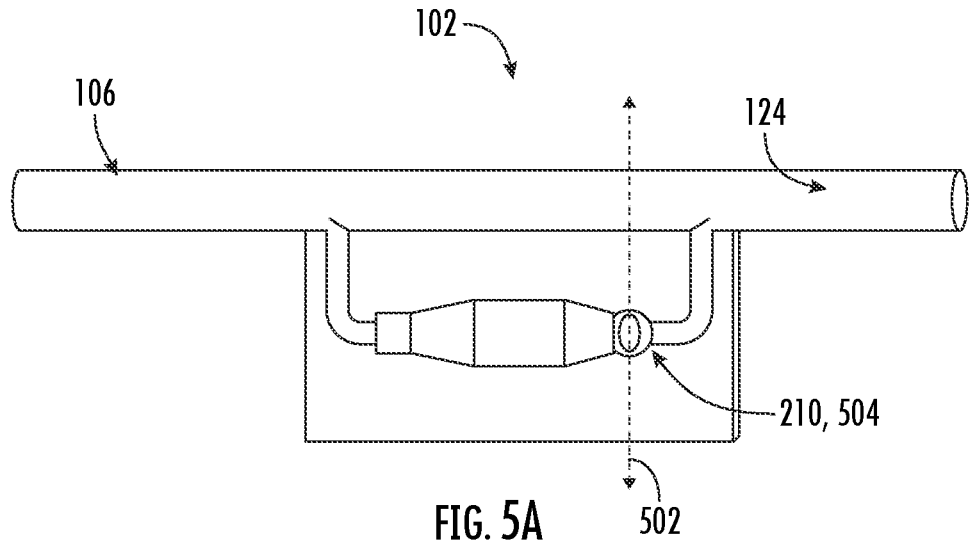
FIG. 5A illustrates another example flow sampling apparatus comprising a ball valve in accordance with an example embodiment of the present disclosure.
Figure 5B:
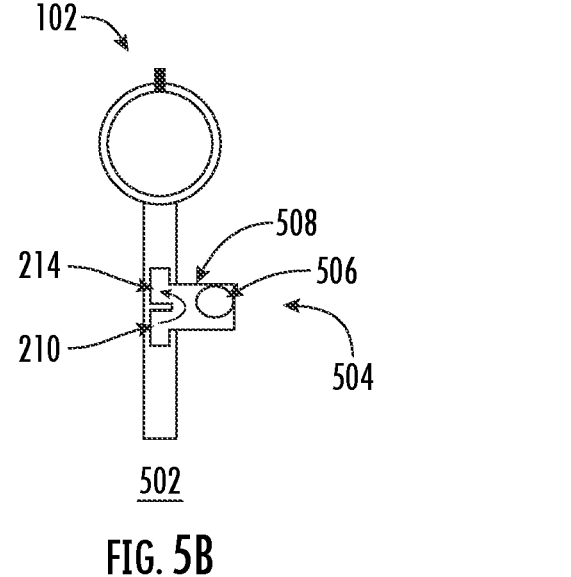
FIG. 5B illustrates a cross-section view of an example ball valve in an open position in accordance with an example embodiment of the present disclosure.
Figure 5C:
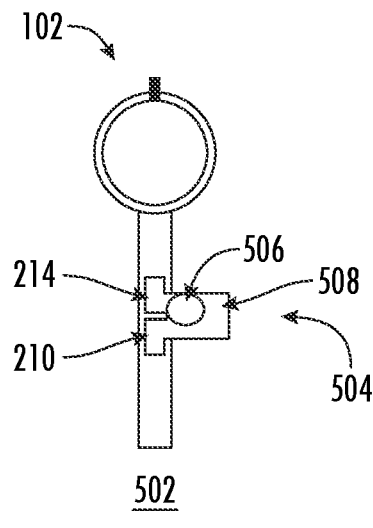
FIG. 5C illustrates a cross-section view of an example ball valve in a closed position in accordance with an example embodiment of the present disclosure.

As further illustrated in FIG. 2A, the example bypass tube 126 includes a flow control valve 210. A flow control valve 210 may be any mechanism, structure, device, or similar feature that may be used to reduce and/or increase the flow of discharge fluid 124 through the bypass tube 126. In some embodiments, the flow of discharge fluid 124 through the bypass tube 126, and particularly through the imaging region 208 may be controlled for proper functioning of the external device. In some embodiments, the flow control valve 210 may be controlled by an external device, for example, through the use of one or more actuators. As further described in FIG. 5A-5C, in some embodiments, a ball valve (e.g., ball valve 504 as depicted in FIG. 5A-FIG. 5C) may be used to control the flow of fluid through the bypass tube 126. Utilizing the combination of the flow detection region 206 and the flow control valve 210, an external device may monitor and control the flow of fluid through the imaging region 208 of the bypass tube 126, such that accurate cytometry measurements may be made.

Figure 2B:
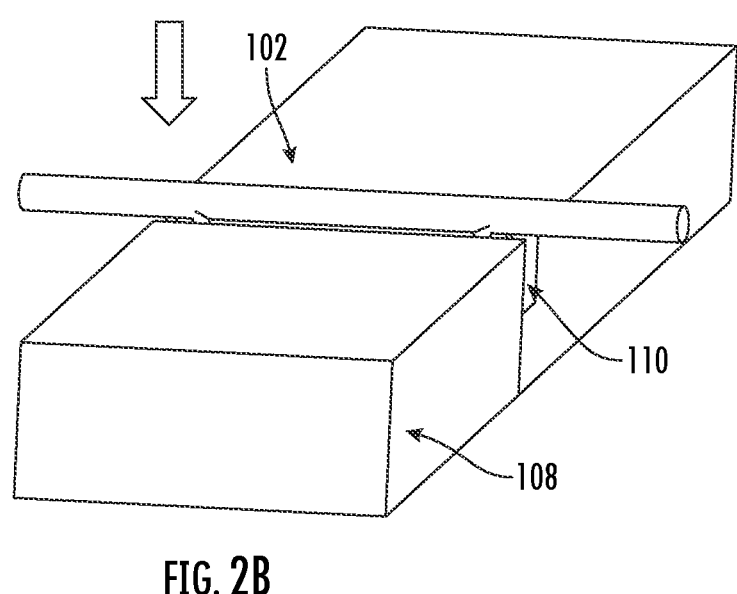
FIG. 2B illustrates an example flow sampling cassette inserted into a cytometry device in accordance with an example embodiment of the present disclosure.

Referring now to FIG. 2B, an example integrated flow sampling apparatus 102 is shown with the integrated flow sampling cassette 104 inserted into the sampling cassette slot 110 of a flow cytometry device 108. As depicted in FIG. 2B, the integrated flow sampling cassette 104 may be designed to fit in the sampling cassette slot 110 of an external device (e.g., flow cytometry device 108). In some embodiments, a flow cytometry device 108 may utilize one or more light sources, such as a laser to illuminate particles in a fluid. Based on the reflections, scattering, and the occlusion of the light, a flow cytometry device 108 may classify and count various types of cells (cytometry measurements) including red blood cells, white blood cells, lymphocytes, neutrophils, monocytes, cancer cells, and other similar structures. In addition, in some embodiments, a flow cytometry device 108 may capture a hologram of body fluid cells. Such a hologram may be further processed to determine various features of body fluid cells. Cytometry measurements may also be used to perform complete blood counts which may indicate diseases, disorders, or infections in a patient. Cytometry measurements can be an important tool for medical professionals when determining the overall health of a patient 120.

In some embodiments, the flow cytometry device 108 may include additional features to interact with the flow detection region 206 and/or the flow control valve 210 of the integrated flow sampling cassette 104. In some embodiments, the flow cytometry device 108 may monitor and control the flow of fluid through the bypass tube 126 by utilizing the flow detection region 206 and/or the flow control valve 210.

As depicted in FIG. 2B, by inserting the integrated flow sampling cassette 104 directly into the flow cytometry device 108, flow cytometry measurements may be made without drawing a sample of bodily fluid from the patient 120 or the discharge fluid 124. Utilizing the integrated flow sampling cassette 104 in this way reduces the likelihood of contaminating the fluid sample, reduces the amount of time required to perform flow cytometry tests, reduces the discomfort to the patient 120, and/or improves the diagnosis and medical provided to the patient 120.

Figures 3A, 3B, 3C, 3D, 3E, 3F, 3G:
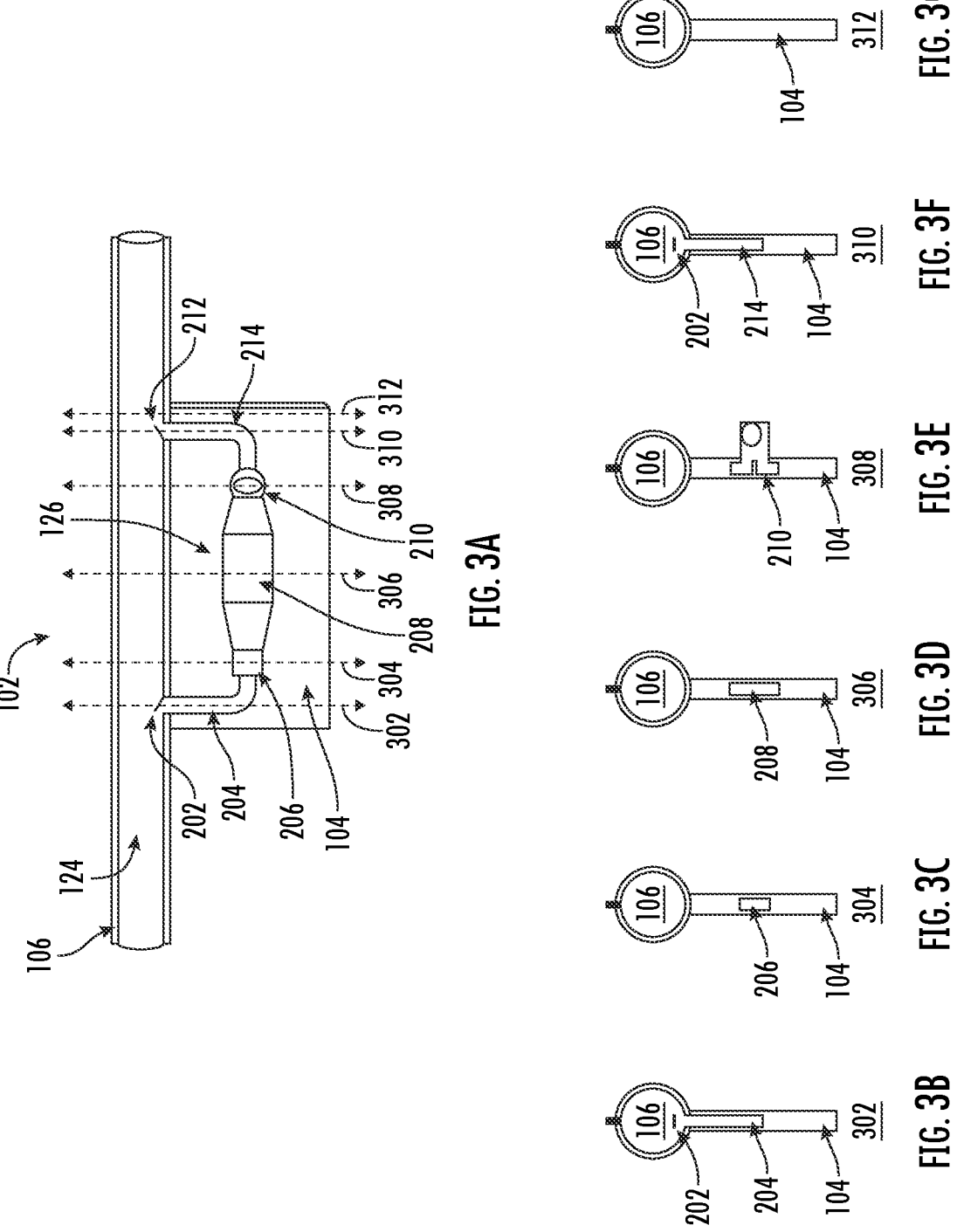
FIG. 3A illustrates various components of an example flow sampling apparatus in accordance with an example embodiment of the present disclosure.
FIG. 3B-FIG. 3G illustrate cross-section views of an example integrated flow sampling apparatus in accordance with an example embodiment of the present disclosure.

Referring now to FIG. 3A, an example integrated flow sampling apparatus 102 is provided. FIG. 3A indicates various locations (e.g., line 302, line 304, line 306, line 308, line 310, and line 312) at which corresponding cross-section views are provided in FIG. 3B-FIG. 3G.

Referring now to FIG. 3B, a cross-section view corresponding with line 302 of the example integrated flow sampling apparatus 102 of FIG. 3A is provided. As shown in FIG. 3B, the bypass flow inlet tube 204 is formed within the integrated flow sampling cassette 104. In some embodiments, the bypass flow inlet tube 204 may be formed by etching or carving the structure into one or more thermoplastic portions before attaching two portions together to form the integrated flow sampling cassette 104. In some embodiments, the bypass flow inlet tube 204 may comprise a diameter between 2 millimeters and 11 millimeters; more preferably between 2.5 millimeters and 10.5 millimeters; most preferably between 3 millimeters and 10 millimeters. As further depicted in FIG. 3B, the bypass flow inlet tube 204 fluidly connects to the discharge tube 106. The inlet flow membrane 202 opens into the flow of discharge fluid 124 and directs a portion of the discharge fluid 124 into the bypass flow inlet tube 204.

Referring now to FIG. 3C, a cross-section view corresponding with line 304 of the example integrated flow sampling apparatus 102 of FIG. 3A is provided. As shown in FIG. 3C, the flow detection region 206 is formed within the integrated flow sampling cassette 104. In some embodiments, the flow detection region 206 may be formed by etching or carving the structure into one or more thermoplastic portions before attaching two portions together to form the integrated flow sampling cassette 104. In some embodiments, the surface of the integrated flow sampling cassette 104 corresponding with the flow detection region 206 may be transparent or semi-transparent to facilitate a flow determination through optical means as further described in relation to FIG. 6A. In some embodiments, the surface of the integrated flow sampling cassette 104 corresponding with the flow detection region 206 comprise a flexible material facilitating the determination of flow through pressure measurements as further described in relation to FIG. 6B.

Referring now to FIG. 3D, a cross-section view corresponding with line 306 of the example integrated flow sampling apparatus 102 of FIG. 3A is provided. As shown in FIG. 3D, the imaging region 208 is formed within the integrated flow sampling cassette 104. In some embodiments, the imaging region 208 may be formed by etching or carving the structure into one or more thermoplastic portions before attaching two portions together to form the integrated flow sampling cassette 104. The imaging region 208 may be dimensioned according to the requirements of the external measurement device such that the flow through the imaging region 208 complies with the requirements of the external measurement device as further described in relation to FIG. 2A.

Referring now to FIG. 3E, a cross-section view corresponding with line 308 of the example integrated flow sampling apparatus 102 of FIG. 3A is provided. As shown in FIG. 3E, the flow control valve 210 is formed within the integrated flow sampling cassette 104. In some embodiments, the flow detection region 206 may be formed by etching or carving the structure into one or more thermoplastic portions before attaching two portions together to form the integrated flow sampling cassette 104. Further, in an embodiment in which a ball valve is utilized, as shown in FIG. 3E, a ball may be placed between the two portions during the attaching process. A flow control valve 210 may be utilized to control the flow of a fluid through the bypass tube 126 as further described in relation to FIG. 5A-FIG. 5C.

Referring now to FIG. 3F, a cross-section view corresponding with line 310 of the example integrated flow sampling apparatus 102 of FIG. 3A is provided. As shown in FIG. 3F, the bypass flow outlet tube 214 is formed within the integrated flow sampling cassette 104. In some embodiments, the bypass flow outlet tube 214 may be formed by etching or carving the structure into one or more thermoplastic portions before attaching two portions together to form the integrated flow sampling cassette 104. In some embodiments, the bypass flow outlet tube 214 may comprise a diameter between 2 millimeters and 11 millimeters; more preferably between 2.5 millimeters and 10.5 millimeters; most preferably between 3 millimeters and 10 millimeters. As further depicted in FIG. 3F, the bypass flow outlet tube 214 fluidly connects to the discharge tube 106. The outlet flow membrane 212 opens away from the flow of discharge fluid 124 and aids the portion of the discharge fluid 124 in the bypass flow outlet tube 214 in re-entering the discharge tube 106.

Referring now to FIG. 3G, a cross-section view corresponding with line 312 of the example integrated flow sampling apparatus 102 of FIG. 3A is provided. As shown in FIG. 3G, the integrated flow sampling cassette 104 is sealed near the edges with no features extending to the edge of the integrated flow sampling cassette 104, containing the discharge fluid within the integrated flow sampling cassette 104. In some embodiments, the integrated flow sampling cassette 104 may be formed by attaching two portions of molded thermoplastic together, having the features of the bypass tube 126 etched or carved between the two portions.

Referring now to FIG. 4A, another example integrated flow sampling apparatus 102 is provided. FIG. 4A indicates various locations (e.g., line 402, line 404) at which corresponding cross-section views are provided in FIG. 4B and FIG. 4C. As further depicted in FIG. 4A, the example integrated flow sampling apparatus 102 includes adhesion features 406, 408 to promote sufficient adhesion, strength and rigidity when assembling an integrated flow sampling apparatus 102 formed from two separate pieces.

Referring now to FIG. 4B, a cross-section view corresponding with line 402 of the example integrated flow sampling apparatus 102 of FIG. 4A is provided. As shown in FIG. 4B, in some embodiments, the discharge tube 106 may comprise two halves attached to form a tube or conduit through which discharge fluid 124 may flow. As depicted in FIG. 4B, the two halves of the discharge tube 106 are each a semi-circle, which when attached form a circular tube. While depicted as a circular tube, the two halves may be any cross-sectional shape that, when attached, form a sealed conduit through which discharge fluid 124 may flow. The example discharge tube 106 of FIG. 4B, further depicts a pair of adhesion features 406 on the top side of the discharge tube 106 and a pair of adhesion features 408 on the bottom side of the discharge tube 106. In some embodiments, the adhesion features 406, 408 may be fused together to form the discharge tube 106. The adhesion features 406, 408 promote good adhesion of the two-part assembly to increase mechanical strength and rigidity, as well as prevent leakage of the flowing discharge fluid 124.

Referring now to FIG. 4C, a cross-section view corresponding with line 404 of the example integrated flow sampling apparatus 102 of FIG. 4A is provided. As shown in FIG. 4C, in some embodiments, the discharge tube 106 may be integrated with the integrated flow sampling cassette 104 in a single integrated structure. As depicted in FIG. 4C, the discharge tube 106 and the integrated flow sampling cassette 104 may each be formed from two molded portions of material, fused together to define the features of the integrated flow sampling apparatus 102. As shown in FIG. 4C, the example integrated flow sampling apparatus 102 includes a first molded component 410 and a second molded component 412. In some embodiments, the features of the integrated flow sampling cassette 104 (e.g., bypass flow inlet tube 204, flow detection region 206, imaging region 208, flow control valve 210, bypass flow outlet tube 214) may be etched on one or both of the molded halves. For example, in some embodiments, half of the bypass flow inlet tube 204 may be etched or carved in the first molded component 410 and the reciprocal half of the bypass flow inlet tube 204 may be etched or carved at a corresponding location on the second molded component 412. In such an instance, when the first molded component 410 and the second molded component 412 are fused or attached, the two sides of the bypass flow inlet tube 204 may be aligned to define the full feature. A similar process may be utilized to define other features of the integrated flow sampling cassette 104. In addition, the first molded component 410 and the second molded component 412 may promote good adhesion of the two-part assembly to increase mechanical strength and rigidity, as well as prevent leakage of the flowing discharge fluid 124 from the features defined on the integrated flow sampling cassette 104. In some embodiments, the first molded component 410 and the second molded component 412 may comprise a biocompatible material such as PVC, polyethylene, thermoplastic elastomers, polypropylene plastic, or other material suitable for use in medical applications.

Referring now to FIG. 5A, another example integrated flow sampling apparatus 102 is provided. FIG. 5A indicates a location (e.g., line 502) at which corresponding cross-section views are provided in FIG. 5B and FIG. 5C. As further depicted in FIG. 5A, the example integrated flow sampling apparatus 102 includes a flow control valve 210, implemented as a ball valve 504. While depicted as a ball valve 504, a flow control valve 210 may be implemented as any control valve, latch gate, etc. that may be utilized to reduce and/or increase the flow of fluid (e.g., discharge fluid 124) through the flow control valve 210.

Referring now to FIG. 5B and FIG. 5C, an example ball valve 504, in an open position (FIG. 5B) and in a closed position (FIG. 5C) is depicted. As depicted in FIG. 5B, when the example ball valve 504 is in an open position, the discharge fluid 124 is allowed to flow through the flow bypass path 508 and into the bypass flow outlet tube 214, permitting the flow of discharge fluid 124 through the ball valve 504 is allowed. As depicted in FIG. 5C, when the example ball valve 504 is in a closed position, the flow of discharge fluid 124 into the bypass flow outlet tube 214 is prevented by the position of the ball 506.

As depicted in FIG. 5B and FIG. 5C, the example ball valve 504 includes a flow bypass path 508 containing a ball 506. The ball 506 may be any structure, feature, device, latch, gate, valve, or similar mechanism designed to obstruct the flow of fluid when moved into a position within the flow of fluid (such as shown in FIG. 5C). In some embodiments, the ball 506 may comprise a magnetic material, such as steel. In some embodiments, the ball 506 may be further coated with Teflon to seal and protect the interior steel.

The flow bypass path 508 may be any alternate path, conduit, tube, or other similar structure that may be closed by the ball 506 or other similar device. For example, as depicted in FIG. 5B and FIG. 5C, the flow of fluid may encounter a barrier in the primary path, forcing the fluid to enter the flow bypass path 508 and pass through the flow bypass path 508 and into the bypass flow outlet tube 214 when the ball 506 is positioned such as in FIG. 5B. Alternatively, when the ball 506 is positioned such as in FIG. 5C, the flow bypass path 508 may be blocked, such that fluid may not pass into or through the flow bypass path 508 and into the bypass flow outlet tube 214.

In some embodiments, the flow control valve 210 may comprise a primary flow path into which the ball 506 may be moved to block the flow of fluid and removed to allow fluid to pass into the bypass flow outlet tube 214.

In some embodiments, a flow cytometry device 108 may include one or more actuators or other similar mechanism to control the position of the ball 506. In such an embodiment, an actuator may be utilized to magnetically pull and/or push the ball 506 out of the flow of fluid, for example, against the outer wall of the flow bypass path 508 (such as depicted in FIG. 5B), allowing fluid to pass into the flow bypass path 508. The flow cytometry device 108 may additionally pull and/or push the ball 506 into the flow of fluid, for example against the inlet and/or outlet of the flow bypass path 508, such as shown in FIG. 5C, preventing the flow of fluid into the bypass flow outlet tube 214.

Referring now to FIG. 6A, an example integrated flow sampling apparatus 102 including an optical flow detection region 602 is provided. In some embodiments, the flow of fluid (e.g., discharge fluid 124) through the bypass tube 126 may be determined by optical means utilizing the optical flow detection region 602. An optical flow detection region 602 may be any region of the bypass tube 126 that provides visibility into the bypass tube 126 by optical means. Optical means of flow detection may include determine the flow of fluid based on visual cues, such as movement of particles in the direction of flow. Optical flow sensors may include visible light sensors, such as charge-coupled device (CCD) sensors and complementary metal-oxide-semiconductor (CMOS) sensors, infrared light sensors, thermal imaging, radar, sonar, photodiodes, and other optical sensors. In some embodiments, the optical flow detection region 602 may comprise a transparent and/or semi-transparent surface allowing visibility into the bypass tube 126. In some embodiments, an optical sensor and accompanying processor/memory may determine if a fluid (e.g., discharge fluid 124) is flowing through the bypass tube 126 and/or the rate of flow. In some embodiments, an optical sensor may detect the presence and movement of particles of the fluid through the optical flow detection region 602 and utilize such detections to determine the flow and/or rate of flow of fluids through the bypass tube 126. In some embodiments, a flow cytometry device 108 may include an optical flow sensor that aligns with the optical flow detection region 602 of the integrated flow sampling cassette 104. In such an embodiment, the flow cytometry device 108 may determine the flow and/or rate of flow of the discharge fluid 124 in coordination with observed measurements. By monitoring the flow of discharge fluid 124 through the bypass tube 126, the flow cytometry device 108 may determine the discharge fluid 124 previously measured has been discharged before making a separate measurement. In addition, in some embodiments, the flow cytometry device 108 may utilize the rate of flow of discharge fluid 124 through the bypass tube 126 to further deduce the count and classification of various types of cells.

Figure 6B:
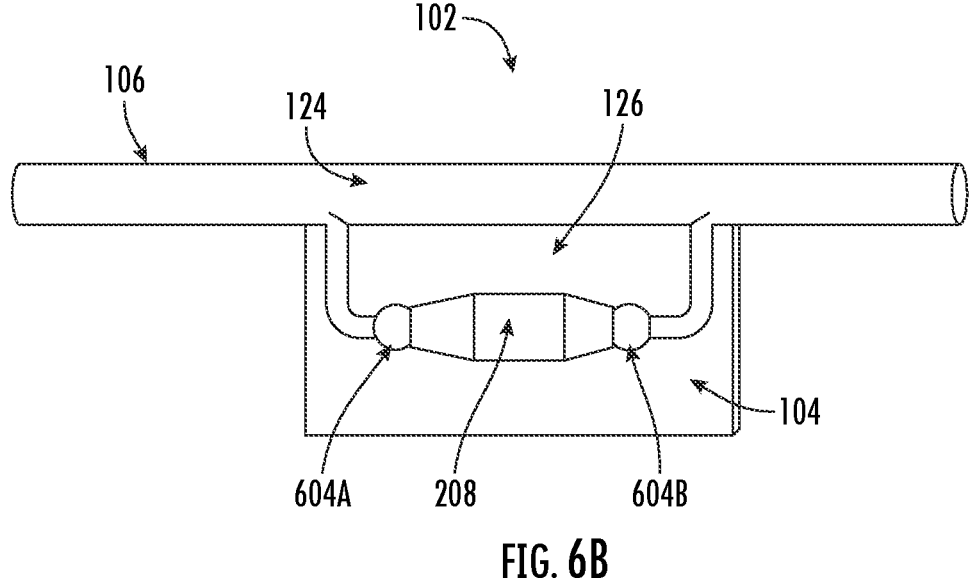
FIG. 6B illustrates an example flow sampling apparatus comprising an example flow detection membrane, enabling detection of pressure within a bypass tube in accordance with an example embodiment of the present disclosure.

Referring now to FIG. 6B, an example integrated flow sampling apparatus 102, including a plurality of pressure flow detection regions 604A, 604B, is provided. In some embodiments, the flow of fluid (e.g., discharge fluid 124) through the bypass tube 126 may be determined by the use of pressure measurements obtained from pressure flow detection regions 604A, 604B. A pressure flow detection region 604A, 604B may be any region of the bypass tube 126 that provides insight into the pressure within the bypass tube 126. The pressure flow detection regions 604A, 604B, in some embodiments, may comprise a thin membrane that deforms in relation to the pressure within the bypass tube 126. In some embodiments, the surface of the pressure flow detection regions 604A, 604B may comprise a thin membrane of PVC or polycarbonate material. In some embodiments, a pressure sensor may determine if a fluid (e.g., discharge fluid 124) is flowing through the bypass tube 126 based on the pressure within the bypass tube 126 as evidenced by the pressure flow detection region 604A, 604B. In some embodiments, a pressure sensor, or plurality of pressure sensors may determine the rate of flow of a fluid through the bypass tube 126 based on the pressure within the bypass tube 126. In such an embodiment, an external device may determine the differential pressure between two disparate points along the bypass tube 126, for example, by pressure measurements from a plurality of flow detection regions 206 (e.g., pressure flow detection region 604A and pressure flow detection region 604B). In some embodiments, one pressure flow detection region (e.g., pressure flow detection region 604A) may be positioned upstream in relation to the flow direction of the discharge fluid 124 from the imaging region 208, while a second pressure flow detection region (e.g., pressure flow detection region 604A) may be position downstream in relation to the flow direction of the discharge fluid 124 from the imaging region 208. Utilizing the differential pressure, in combination with the dimensions of the bypass tube 126, an external device may determine the flow rate of fluid through the bypass tube 126. In some embodiments, a flow cytometry device 108 may include one or more pressure sensors that align with the pressure flow detection regions 604A, 604B of the integrated flow sampling cassette 104. In such an embodiment, the flow cytometry device 108 may determine the flow and/or rate of flow of the discharge fluid 124 in coordination with observed measurements. By monitoring the flow of discharge fluid 124 through the bypass tube 126, the flow cytometry device 108 may determine the discharge fluid 124 previously measured has been discharged before making a separate measurement. In addition, in some embodiments, the flow cytometry device 108 may utilize the rate of flow of discharge fluid 124 through the bypass tube 126 to further deduce the count and classification of various types of cells.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in any method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. An integrated flow sampling apparatus for obtaining cytometry measurements, comprising:
   a discharge tube, fluidly connecting a catheter to a drainage bag, wherein a discharge fluid flows from the catheter to the drainage bag;
   an integrated flow sampling cassette, comprising:
      a bypass tube comprising a first end and a second end, wherein the first end and the second end are each fluidly connected to the discharge tube, the bypass tube further comprising:
         a flow detection region enabling detection of a flow of discharge fluid through the bypass tube;
         an imaging region enabling detection of structures within the flow of discharge fluid; and
         a flow control valve enabling impedance of the flow of discharge fluid through the bypass tube;
      a first protrusion extending from the first end of the bypass tube into the discharge tube at a first pre-determined angle such that the first protrusion directs a portion of the discharge fluid into the bypass tube, wherein the first protrusion extends from the first end of the bypass tube in an upstream direction along the flow of discharge fluid in the discharge tube; and
      a second protrusion extending from the second end of the bypass tube into the discharge tube at a second pre-determined angle such that the second protrusion facilitates a re-entry of the discharge fluid into the discharge tube, wherein the second protrusion extends from the second end of the bypass tube in a downstream direction along the flow of the discharge fluid in the discharge tube.

2. The integrated flow sampling apparatus of claim 1, wherein the flow detection region comprises a thin membrane, wherein the thin membrane deforms in response to a change in pressure.

3. The integrated flow sampling apparatus of claim 1, wherein the flow detection region comprises a transparent membrane, enabling detection of flow through optical means.

4. The integrated flow sampling apparatus of claim 1, wherein the imaging region controls the flow of discharge fluid such that an external device may detect cells within the discharge fluid.

5. The integrated flow sampling apparatus of claim 1, wherein the imaging region is less than one square centimeter.

6. The integrated flow sampling apparatus of claim 1, wherein the imaging region is between 5.5 millimeters and 6.5 millimeters long, between 5.5 millimeters and 6.5 millimeters tall, and between 0.35 millimeters and 0.45 millimeters deep.

7. The integrated flow sampling apparatus of claim 1, wherein the flow control valve is a ball valve.

8. The integrated flow sampling apparatus of claim 1, wherein the flow control valve is controlled by an external device.

9. The integrated flow sampling apparatus of claim 8, wherein the external device is a flow cytometry device.

10. The integrated flow sampling apparatus of claim 8, wherein the integrated flow sampling cassette is defined to fit within a measurement slot on the external device.

11. The integrated flow sampling apparatus of claim 1, wherein the integrated flow sampling cassette comprises molded components.

12. The integrated flow sampling apparatus of claim 11, wherein the integrated flow sampling cassette comprises a plurality of molded components attached to form the bypass tube.

13. The integrated flow sampling apparatus of claim 1, further comprising a second flow detection region, wherein the flow detection region is positioned upstream from the imaging region and the second flow detection region is positioned downstream from the imaging region.

14. The integrated flow sampling apparatus of claim 13, wherein the external device measures a first pressure at the flow detection region and a second pressure at the second flow detection region and determines a flow rate based on the first pressure, the second pressure, and one or more dimensions of the bypass tube.

15. The integrated flow sampling apparatus of claim 1, wherein the first pre-determined angle is between 20 and 30 degrees.

16. The integrated flow sampling apparatus of claim 1, wherein the second pre-determined angle is between 20 and 30 degrees.

17. An integrated flow cytometry measurement system, comprising:
   a catheter inserted into a body of a patient;
   a discharge tube, fluidly connecting the catheter to a drainage bag, wherein a discharge fluid flows from the catheter to the drainage bag;
   an integrated flow sampling cassette, comprising:
      a bypass tube comprising a first end and a second end, wherein the first end and the second end are each fluidly connected to the discharge tube, the bypass tube further comprising:
         a flow detection region enabling detection of a flow of discharge fluid through the bypass tube;
         an imaging region enabling detection of cells within the flow of discharge fluid; and
         a flow control valve enabling impedance of the flow of discharge fluid through the bypass tube;
      a first protrusion extending from the first end of the bypass tube into the discharge tube at a first pre-determined angle such that the first protrusion directs a portion of the discharge fluid into the bypass tube, wherein the first protrusion extends from the first end of the bypass tube in an upstream direction along the flow of discharge fluid in the discharge tube;
      a second protrusion extending from the second end of the bypass tube into the discharge tube at a second pre-determined angle such that the second protrusion facilitates a re-entry of the discharge fluid into the discharge tube, wherein the second protrusion extends from the second end of the bypass tube in a downstream direction along the flow of the discharge fluid in the discharge tube; and a flow cytometry device, wherein the integrated flow sampling cassette is inserted into a measurement slot on the flow cytometry device, and wherein the flow cytometry device determines a count of at least one cell type within the flow of discharge fluid.

18. An integrated flow cassette for obtaining cytometry measurements, comprising:

a first molded component; and a second molded component;

wherein at least one surface of the first molded component and/or the second molded component are etched to form a bypass tube, the bypass tube comprising:

a first end;

a second end; and an imaging region, wherein the first end and the second end are each fluidly connected to a primary flow tube, the primary flow tube facilitating a flow of a fluid comprising at least a portion of bodily fluid from a catheter to a discharge bag, wherein the bypass tube defines a first protrusion that extends out from the first end of the bypass tube into the primary flow tube at a first pre-determined angle such that the first protrusion directs a subportion of the portion of bodily fluid into the bypass tube, wherein the first protrusion extends from the first end of the bypass tube in an upstream direction along the flow of the fluid in the primary flow tube, wherein the bypass tube defines a second protrusion that extends out from the second end of the bypass tube into the primary flow tube at a second pre-determined angle such that the second protrusion facilitates a re-entry of the subportion of the portion of bodily fluid into the primary flow tube, wherein the second protrusion extends from the second end of the bypass tube in a downstream direction along the flow of the fluid in the primary flow tube, wherein the imaging region enables detection of structures within the flow of the fluid by an external device, and wherein the first molded component and the second molded component are attached, such that the bypass tube is formed in a space between the first molded component and the second molded component.

19. The integrated flow cassette of claim 18, wherein the external device is a flow cytometry device and the integrated flow cassette is designed to fit into a measurement slot on the flow cytometry device.

20. The integrated flow cassette of claim 18, wherein the bypass tube further comprises:

a flow detection region enabling detection of the flow of the fluid comprising at least the portion of bodily fluid through the bypass tube; and a flow control valve enabling an impedance of the flow of the fluid comprising at least the portion of bodily fluid through the bypass tube.

* * * * *